US009934652B2

(12) United States Patent
Gaddy

(10) Patent No.: US 9,934,652 B2
(45) Date of Patent: Apr. 3, 2018

(54) GAME TICKET SETS AND SYSTEM AND METHOD FOR PRODUCING SAME

(71) Applicant: GTECH Corporation, Providence, RI (US)

(72) Inventor: Walter Gaddy, Tallahassee, FL (US)

(73) Assignee: IGT Global Solutions Corporation, Providence, RI (US)

( * ) Notice: Subject to any disclaimer, the term of this patent is extended or adjusted under 35 U.S.C. 154(b) by 48 days.

(21) Appl. No.: 14/870,200

(22) Filed: Sep. 30, 2015

(65) Prior Publication Data

US 2016/0093137 A1 Mar. 31, 2016

Related U.S. Application Data

(60) Provisional application No. 62/057,527, filed on Sep. 30, 2014.

(51) Int. Cl.

| | |
|---|---|
| ***G07F 17/00*** | (2006.01) |
| ***G07F 19/00*** | (2006.01) |
| ***A63F 13/00*** | (2014.01) |
| ***A63F 9/24*** | (2006.01) |
| ***G07F 17/32*** | (2006.01) |
| ***G07F 17/42*** | (2006.01) |
| ***B42D 25/30*** | (2014.01) |
| ***B42D 25/405*** | (2014.01) |
| ***A63F 3/06*** | (2006.01) |

(52) U.S. Cl.
CPC ............ *G07F 17/329* (2013.01); *A63F 3/069* (2013.01); *A63F 3/0655* (2013.01); *B42D 25/30* (2014.10); *B42D 25/405* (2014.10); *G07F 17/326* (2013.01); *G07F 17/42* (2013.01)

(58) Field of Classification Search
CPC ...... A63F 3/0605; A63F 3/065; A63F 3/0655; G07F 17/329
See application file for complete search history.

(56) References Cited

U.S. PATENT DOCUMENTS 3,940,124 A * 2/1976 Johnsen .................. A63F 3/069 273/139
3,956,049 A * 5/1976 Johnsen .................. A63F 3/069 156/200

(Continued)

*Primary Examiner* — Milap Shah
(74) *Attorney, Agent, or Firm* — Williams Mullen; Thomas F. Bergert

(57) ABSTRACT

A printed game card, sheet or ticket set can incorporate multiple individual tickets separated by perforation, scoring or folds, for example. In various embodiments, the game card or sheet is printed with at least one playable game on each individual ticket, wherein the games can be instant win games with game indicia and one or more layers of varnish or rubber-based material that is removable to reveal the indicia. Each ticket on the game card, sheet or ticket set can include individual validation and/or activation indicia. The indicia can be human-readable and/or computer readable. Further, the entire game card, sheet or ticket set can include game or sheet activation indicia, such that when the entire sheet is sold, the entirety of individual game tickets can be activated simultaneously. When the individual game ticket validation codes are read, embodiments of the present invention can operate to individually assess whether the ticket is a winner, as well as whether the ticket has previously been redeemed.

16 Claims, 6 Drawing Sheets

(56) References Cited

U.S. PATENT DOCUMENTS

| | | | | | |
|---|---|---|---|---|---|
| 4,033,611 | A * | 7/1977 | Johnsen | A63F 3/069 | 283/101 |
| 4,099,721 | A * | 7/1978 | Logander | A63F 3/069 | 273/139 |
| 4,398,708 | A * | 8/1983 | Goldman | A63F 3/0645 | 270/1.01 |
| 4,756,533 | A * | 7/1988 | Hopkins | A63F 3/06 | 273/157 R |
| 4,858,123 | A * | 8/1989 | Alexoff | A63F 3/065 | 101/484 |
| 5,125,689 | A * | 6/1992 | Heninger | A63F 3/069 | 273/139 |
| 5,158,293 | A * | 10/1992 | Mullins | A63F 3/069 | 273/139 |
| 5,286,061 | A * | 2/1994 | Behm | A63F 3/0685 | 283/102 |
| 5,286,062 | A * | 2/1994 | Greenwood | A63F 3/069 | 281/2 |
| 5,489,096 | A * | 2/1996 | Aron | A63F 3/065 | 273/138.1 |
| 6,948,742 | B2 * | 9/2005 | Buck | B42D 15/025 | 229/300 |
| 7,922,177 | B2 * | 4/2011 | Payne | A63F 3/0605 | 273/139 |
| 9,656,156 | B2 * | 5/2017 | Gratton | A63F 3/0695 | |
| 2003/0042317 | A1 * | 3/2003 | Behm | A63F 3/0665 | 235/487 |
| 2004/0023711 | A1 * | 2/2004 | Knapp | A63F 3/0665 | 463/17 |
| 2004/0227000 | A1 * | 11/2004 | Behm | A23J 1/14 | 235/487 |
| 2005/0127602 | A1 * | 6/2005 | Scrymgeour | B65D 77/003 | 273/139 |
| 2006/0219794 | A1 * | 10/2006 | Ellis | A63F 3/0695 | 235/487 |
| 2008/0217906 | A1 * | 9/2008 | Ellis | A63F 3/0655 | 283/72 |
| 2015/0042041 | A1 * | 2/2015 | Bedford | A63F 3/0665 | 273/139 |

* cited by examiner

Fig. 2
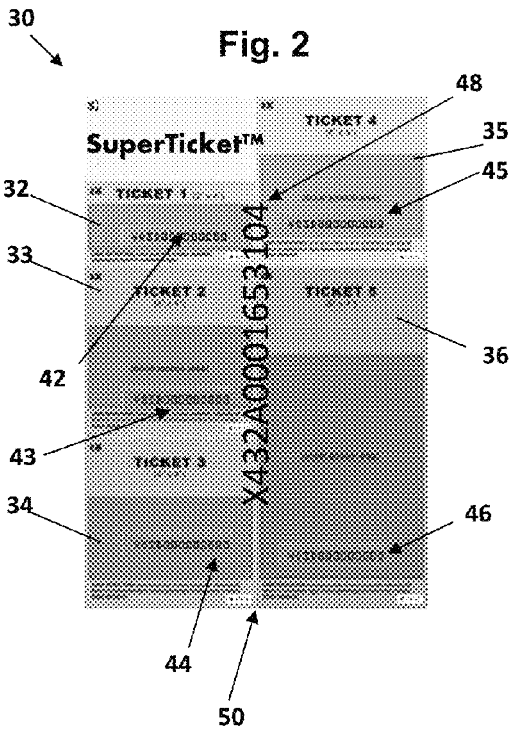
Fig. 3
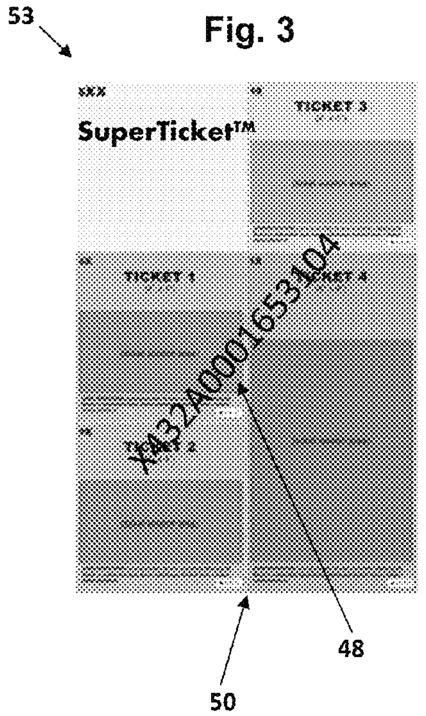
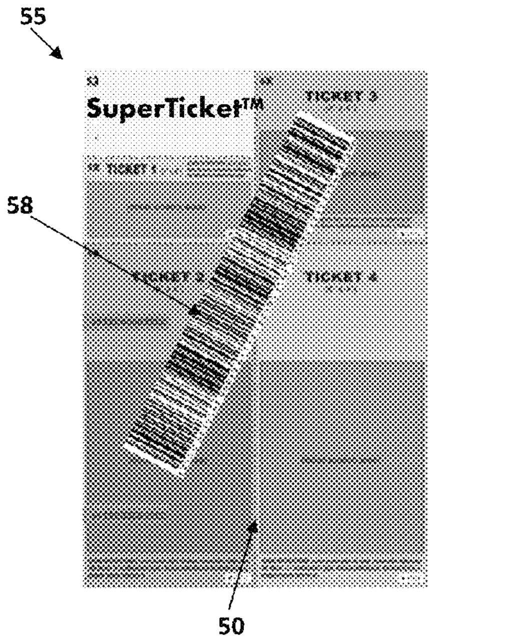
Fig. 4
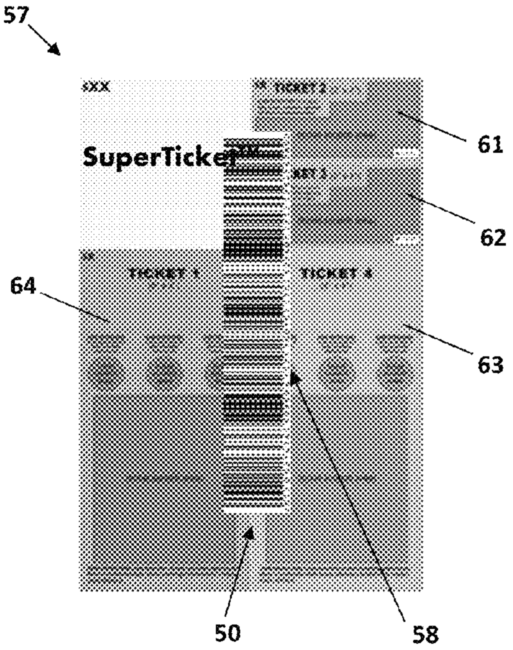
Fig. 5

Fig. 6
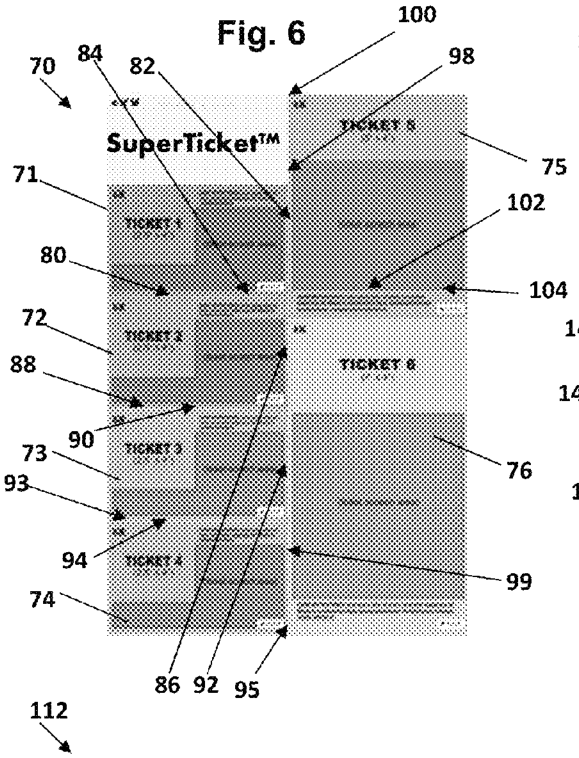
Fig. 7
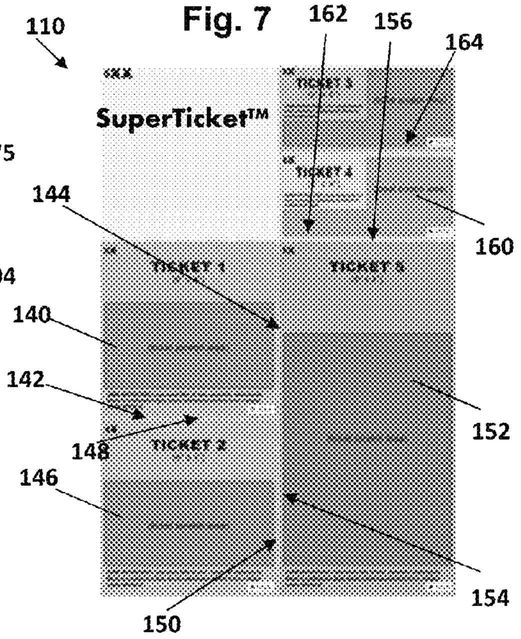
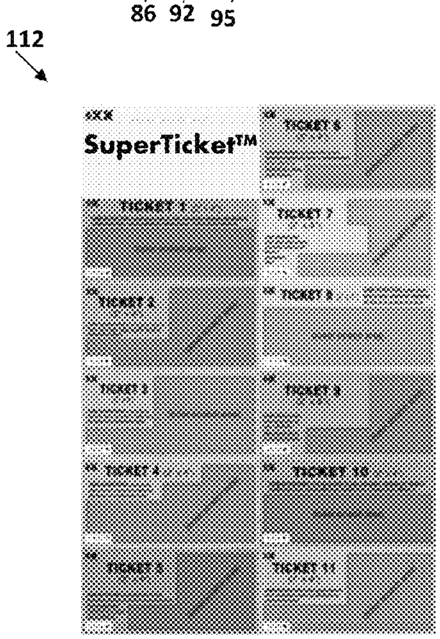
Fig. 8
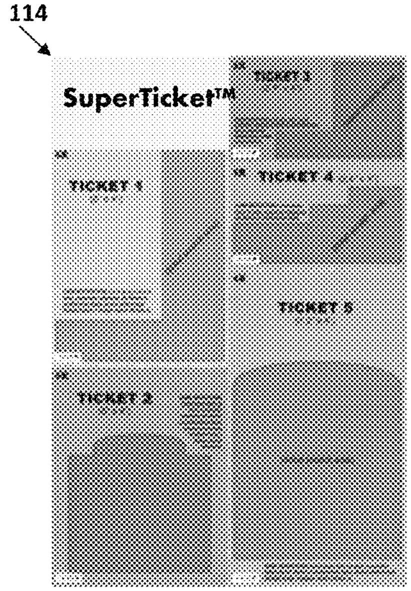
Fig. 9

Fig. 10
116
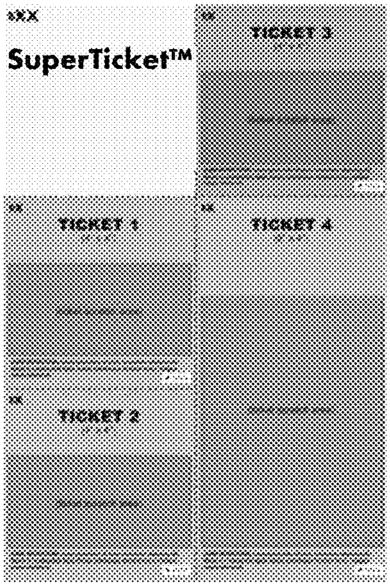
Fig. 11
118
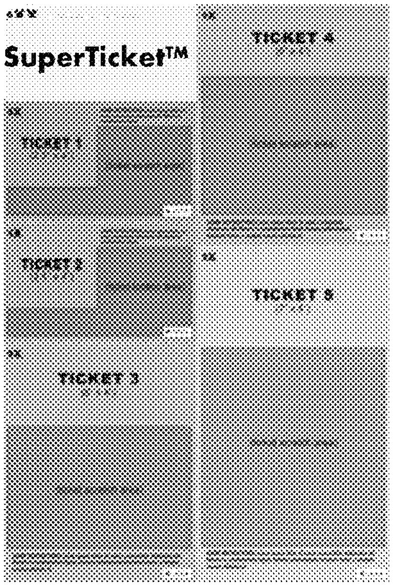
120
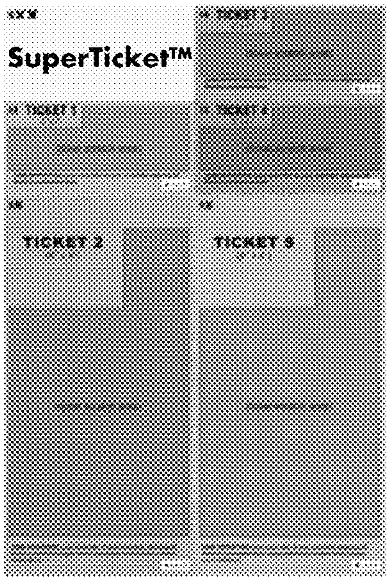
Fig. 12
122
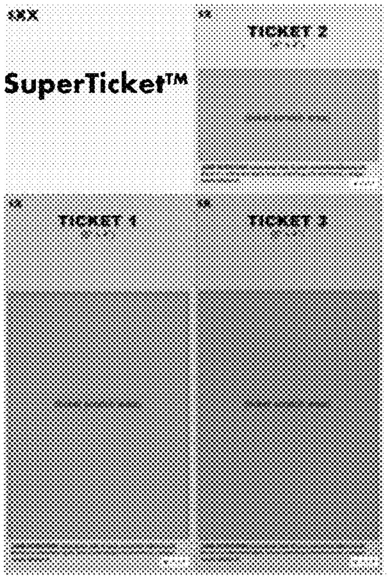
Fig. 13

Fig. 14
124
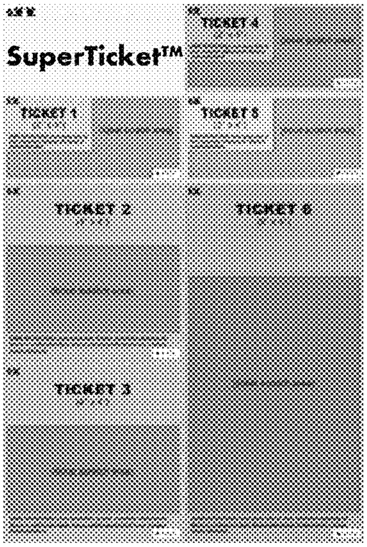
Fig. 15
126
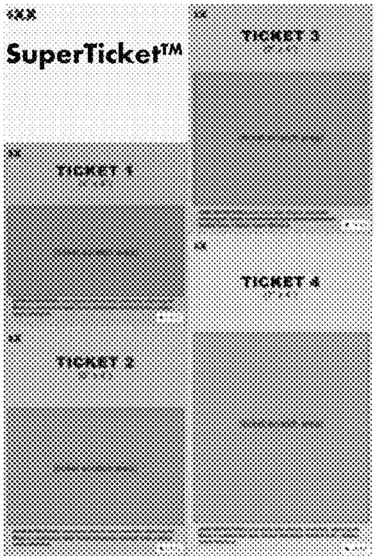
128
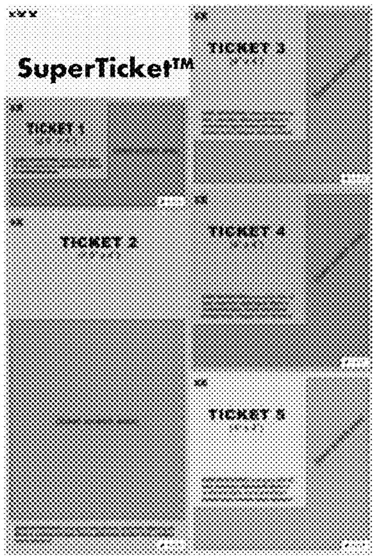
Fig. 16
130
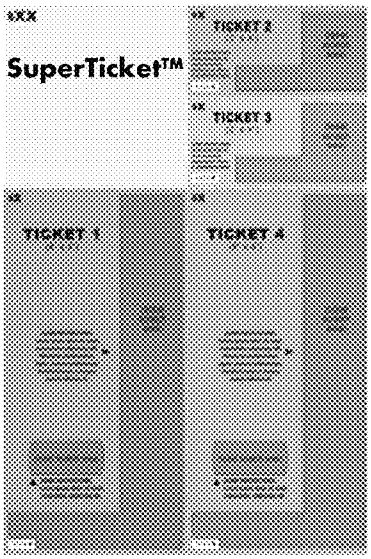
Fig. 17

Fig. 18
132
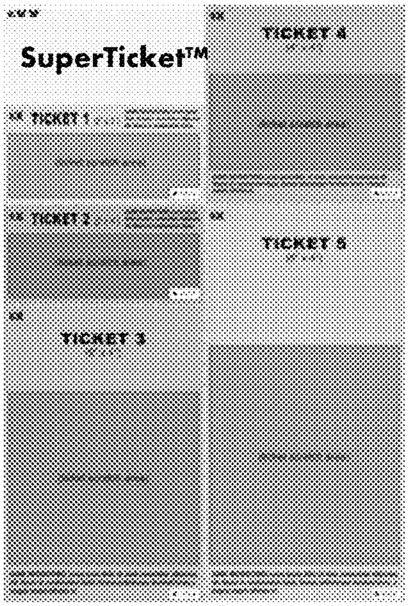
Fig. 19
134
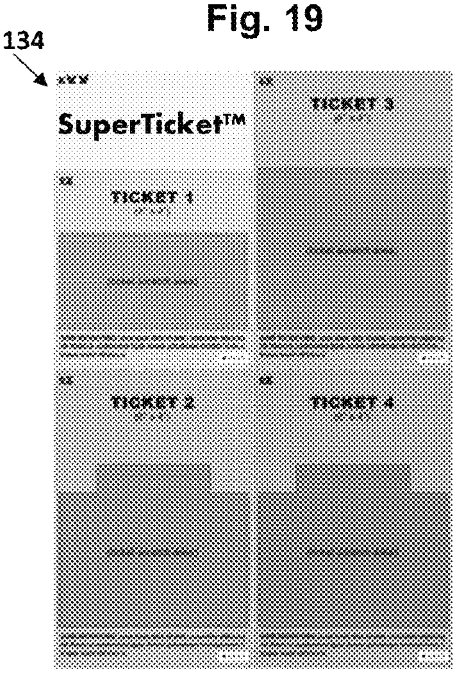
136
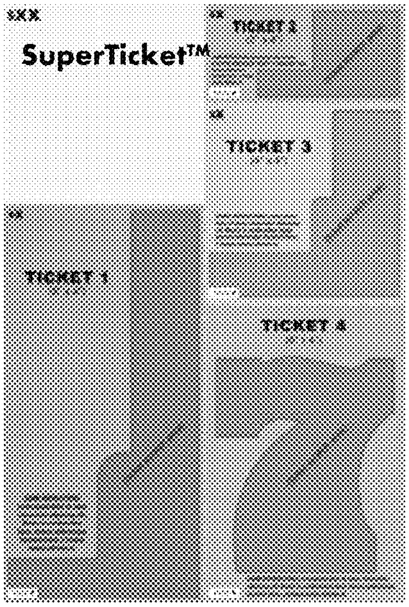
Fig. 20
138
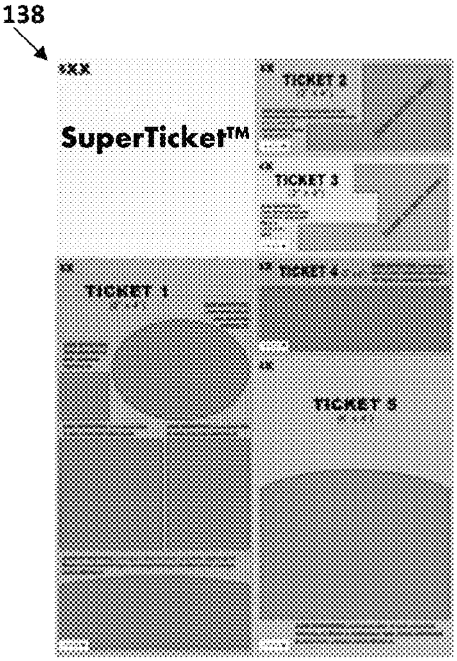
Fig. 21

GAME TICKET SETS AND SYSTEM AND METHOD FOR PRODUCING SAME

FIELD OF THE INVENTION

The present invention pertains to game tickets, and more particularly to a game card, ticket set or sheet that can incorporate multiple, separable, individual tickets.

BACKGROUND AND SUMMARY

Regulated wagering games are common throughout the world. Typical examples are various games offered by state lotteries. Those games, which are offered on a large scale, are operated using centralized transaction processing systems to collect and/or redeem wagers. Most state lotteries and similar entities operate their own central host computing system, or have it operated by a contractor such as IGT, for example. The host computing systems are typically located within the jurisdiction of the lottery provider. The state lotteries also deploy their own client equipment to operate various channels for delivering games to player customers, such as agent-operated lottery game sales terminals, unattended lottery game sales terminals, vending machines, kiosks, electronic access via the Internet from personal computers, mobile phone access, and interactive TV terminal access, for example. They also operate, or have operated on their behalf by a contractor, their own customized administration computing systems, such as accounting, reporting, fraud control, loyalty programs, second chance games and prize redemption systems, for example.

Lottery ticket games are known and are provided in different formats, including instant-win type games and online or drawing-based games. With an instant ticket game, a player typically scratches one or more places on a ticket to determine if he or she is a winner. With drawing-based games, a player typically selects several numbers from a pool of numbers, and a lottery drawing of numbers (such as from a bin of ping pong balls, for example) is conducted later to determine whether there are any winners. Lottery tickets can be physical tickets purchased at retailers or virtual tickets purchased and played online.

In various embodiments of the present invention, a physical game card or sheet is printed as a connected collection of individual ticket games, wherein individual tickets are connected to other individual tickets along one or more edges, and with at least one playable game on each individual ticket. In various embodiments, the games can be instant win games with game indicia and one or more layers of varnish or rubber-based material that is removable to reveal the indicia. In some embodiments, each ticket on the game card or sheet can be printed so as to include individual validation and activation indicia. In other embodiments, all of the tickets contained in a given package or set can be activated once received by the retailer/distributor, such as by the retailer opening the packages and scanning a single activation code found somewhere within the package, whether on a box, inside the box, on an invoice or loose item within the box, or on the ticket packaging itself. In still other embodiments, the entire game card or sheet can be printed so as to include game or sheet activation indicia, such that when the entire sheet is sold, the entirety of individual game tickets can be activated simultaneously. When the individual game ticket validation codes are read, embodiments of the present invention can operate to individually assess whether the ticket is a winner, as well as whether the ticket has previously been redeemed. Individual tickets joined as part of a set can be independently and individually validated, such that if only a subset of the tickets in any given ticket set includes winning tickets, then only those winning tickets require validation before winnings can be paid.

One implementation of a method in accordance with embodiments of the present invention comprises printing indicia on a game card or sheet, wherein the indicia represent multiple game tickets sharing common edges, printing at least one removable layer on the card so as to cover at least a portion of the printed indicia, printing individual game validation indicia or codes on multiple areas of the game card or sheet corresponding to the multiple individual tickets or games, and forming a perforation on the game card or sheet along one or more of the common ticket edges to permit manual separation of individual game tickets from the game card or sheet. A global activation indicia or code can also be printed, and can extend across multiple tickets and one or more perforations or can be printed on an article separate from the tickets, in various embodiments.

In various aspects, the present invention provides a ticket set/package, system and method whereby tickets can be mass produced, connected but separable via perforation at more than one edge, and coded for particular activation and validation protocols as desired.

In various embodiments of the present invention, a game card or sheet is printed as a connected collection of individual ticket games, wherein individual tickets are connected to other individual tickets along one or more edges, and with at least one playable game on each individual ticket. In various embodiments, the games can be instant win games with game indicia and one or more layers of varnish or rubber-based material that is removable to reveal the indicia. In some embodiments, each ticket on the game card or sheet can be printed so as to include individual validation indicia. Further, the entire game card or sheet can be printed so as to include a single game or sheet activation indicia, such that when the entire sheet is sold, the entirety of individual game tickets can be activated simultaneously. When the individual game ticket validation codes are read, embodiments of the present invention can operate to individually assess whether the ticket is a winner, as well as whether the ticket has previously been redeemed.

The detachability of the tickets can be provided such as through perforation, scoring or other method of structural weakening that permits the tickets to be manually separated from one another.

BRIEF DESCRIPTION OF THE DRAWINGS

FIGS. 2 through 21 are diagrams showing exemplary ticket sets in accordance with embodiments of the present invention.

DETAILED DESCRIPTION OF INVENTION EMBODIMENTS

Figure 1:
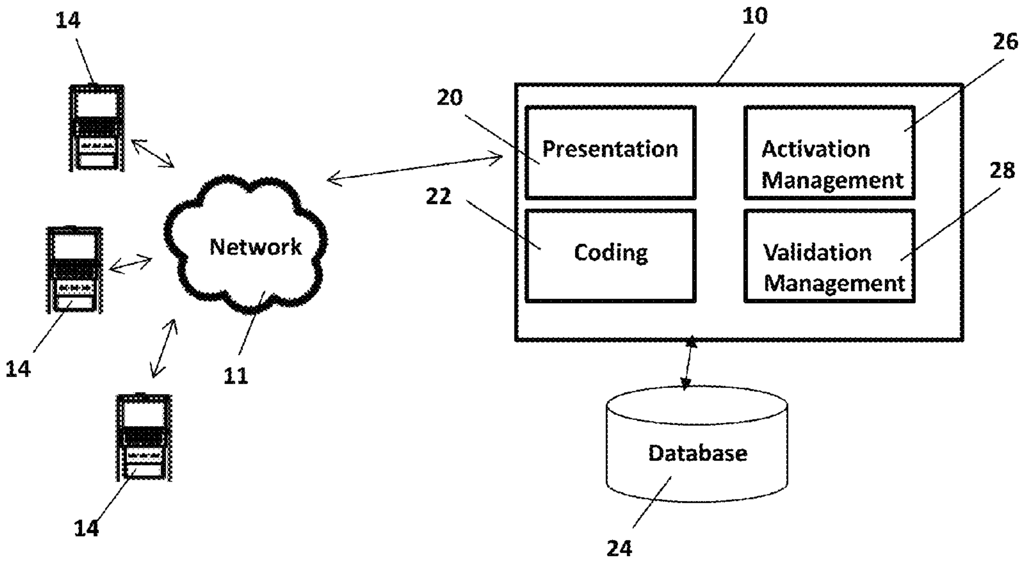
FIG. 1 is an exemplary schematic diagram of a ticket set operating architecture according to embodiments of the present invention.

As shown in FIGS. 1 through 21, the present invention provides a game ticket set whereby individual tickets are packaged together to form a single "super ticket". Perforations, folds, and/or scores can be provided between tickets and along adjoining ticket edges to allow for separation. In various embodiments, each individual ticket within the entire package or set is provided with a unique validation code such that each individual ticket is capable of individual validation. The game can be listed under a single game name and number or can be a collection of game names and game numbers. The prize structure supporting the ticket set can be all inclusive, consisting of the aggregation of individual sub-ticket prizes, or may be a collection of individual prize structures supporting each sub-ticket. The size and/or dimensions of the game sheet can vary depending on the game design. For example, a game sheet may be twelve inches by sixteen inches, or twelve inches by eight inches. In various embodiments, the game sheet can be printed as a single fully integrated ticket design with no perforations, scores, or folds for individual sub-tickets or may be produced with a collection of sub-tickets.

The designs and embodiments of the present invention permit the game sheet to be sold at multiple price points. For example, a first ticket set may sell for $50, and may include tickets at four different price levels (for example, two $10 tickets, four $5 tickets, five $2 tickets and ten $1 tickets), whereas a second ticket set may sell for $25, including one $10 ticket, two $5 tickets, two $2 tickets and five $1 tickets. Other combinations and denominations of tickets can be provided. Themes such as holiday ticket packs, birthday packs, sports packs and other themes can be employed. In various embodiments, the present invention can provide game sheets that ensure a minimum number of wins. The tickets can be sold with a human retailer, or via a standalone or wall-mounted dispenser.

Printing of the ticket sheets can occur so as to facilitate an attractive yet easily managed design. For example, in various embodiments, an underlying substrate such as ticket stock can be provided, and inserted into a printing machine as part of the present invention. The printing machine can print player indicia, game indicia, activation indicia, validation indicia, artwork, opaque material, clear material, scratch-off material and other desired elements on the substrate, or a subset thereof. Content, data, design elements and other items to be printed on the substrate can be generated by a computer system such as system 10 operating programmed instructions stored in a database in accordance with one aspect of the present invention. In various embodiments, the data for multiple games are printed on a given individual substrate. The substrate is then manipulated such as by perforation, folding and/or scoring in order to permit individual game tickets to be removed from the group game substrate. In various embodiments, individual game activation indicia and/or individual game validation indicia are printed on each individual ticket on the sheet. Further, in various embodiments, a sheet activation indicia can be printed on the substrate or packaging for the substrate to enable the full set of tickets to be activated. In other embodiments, all of the tickets contained in a given package or set can be activated once received by the retailer/distributor, such as by the retailer opening the packages and scanning a single activation code found somewhere within the package, whether on a box/package, inside the box, on an invoice or loose item within the box, or on the ticket packaging itself. In various embodiments, sheet activation indicia for all of the tickets in a given sheet are printed over multiple individual tickets such that, should one of the tickets be detached, the sheet may not be activatable. Activation of the sheet or individual tickets can be performed in several ways, including by a retailer scanning a code or other activation indicia from the sheet, individual tickets or otherwise as described herein.

A computer system can operate in accordance with the present invention to generate codes and/or indicia for activation and validation, to receive signals related to activation and validation, and to process the related instructions for later ticket processing. For instance, if a sheet of tickets has been activated, and a given ticket from the sheet is a $100 winner, the winning ticket can be redeemed at a point-of-sale (POS) terminal, whereby the validation code can be scanned and compared with a known validation code for the ticket to confirm that the ticket is a winning ticket that has been activated and that has not previously been redeemed.

FIG. 1 is a schematic diagram illustrating an exemplary system 10 for facilitating electronic lottery activities in accordance with embodiments of the present invention. As shown therein, embodiments of aspects of the system can comprise a computer-based system 10, where the components and/or modules can be implemented in hardware, software, firmware, or combinations thereof. FIG. 1 illustrates an exemplary high-level network 11 with exemplary users and/or external computer systems 14 that can interact with the system 10 of the present invention. The users, e.g., retail clerks or game ticket purchasers, can access the system of the present invention using client computing devices 14, such as desktop computers, laptop computers, mobile communications devices (MCDs), retail ticket dispensers, retail point-of-sale terminals, smart television appliances or one or more public, self-serve game terminals or kiosks in appropriate commercial sites, subject to any jurisdictional limitations, for example. It will be appreciated that the system of the present invention, including the components and modules described herein, can incorporate necessary processing power and memory for storing data and programming that can be employed by the processor to carry out the functions and communications necessary to facilitate the processes and functionalities described herein.

Ticket generators can enter commands and information into respective client computing devices through a user interface including traditional input mechanisms, such as a keyboard and pointing device, commonly referred to as a mouse, trackball or touch pad. Other input devices can include, for example, a microphone, joystick, game pad, satellite dish, scanner, voice recognition device, keyboard, touch screen, toggle switch, pushbutton, gesture based motions or the like. One or more monitors or display devices can be provided with the computing device or game terminal 14 as will be understood in the art. In addition to display devices, the computing devices can also include other peripheral output devices, such as one or more printers, for example, which may be connected through an output peripheral interface. The computers implementing the invention may operate in a networked environment using logical connections to one or more remote computers, the remote computers typically including many or all of the elements described above.

As further shown in FIG. 1, the system 102 can include a presentation module 20, a coding module 22, an activation module 26, and a validation module 28, and further can be coupled to one or more databases 24 and/or other data sources. The presentation module 20 provides details of the available ticket sets to be represented for sale at individual devices. In various embodiments, the ticket set presentation data can include a visual representation of the number of tickets, the format and ticket design of each ticket, the layout of multiple tickets and sample indicia included on the tickets in each ticket set. The coding module 22 provides data regarding activation and/or validation codes to be printed on the ticket sets, individual tickets and/or ticket set packaging. In various embodiments, the presentation module 20 and coding module 22 can communicate directly with one or more ticket printers to generate printed tickets according to the data provided by modules 20 and 22. The activation management component 26 activates individual tickets and/or entire ticket sets or groups of ticket sets, and stores un-activated as well as activated ticket data in database 24. The validation management component can compare scanned validation codes with the database 24 of activated winning tickets. Should the validation management component 28 determine that the validation code is valid and/or authentic for a given ticket, the system 10 communicates with the appropriate terminal that the code is approved, and the retail clerk and/or self-service terminal can pay the winnings to the player. In various embodiments, the system database stores data corresponding to the validation indicia printed on the tickets in given ticket sets, and further receives data corresponding to the reading (e.g., scanning) of at least one of the ticket's validation indicia, and subsequently validates the ticket associated with the validation indicia that has been read.

The above software modules 20, 22, 26 and 28 can be programmed or configured to communicate with one another and with the databases 24. The modules can be recorded on a non-transitory computer-readable medium and include programming instructions to conduct the steps and processes associated therewith. The system of the present invention can execute these software modules to facilitate production, activation and validation of the lottery-type games and processes in accordance with embodiments of the present invention as described herein. The databases 24 can hold records related to tickets produced, tickets activated, tickets redeemed, players and games, including winning combinations, player selections, player and group rules, game presentations and functions and other information and functions.

As shown in FIGS. 2 through 21, various embodiments of ticket sets can be employed in accordance with aspects of the present invention. In FIG. 2, ticket set 30 includes five different tickets 32, 33, 34, 35 and 36 that are attached to form a collective single ticket sheet or set. Each ticket is provided with a respective validation indicia (e.g., a validation number and/or code), such that ticket 32 has validation indicia 42, ticket 33 has validation indicia 43, ticket 34 has validation indicia 44, ticket 35 has validation indicia 45 and ticket 36 has validation indicia 46. It will be appreciated that the validation indicia 42-46 can be exemplified as machine-readable codes, wherein each ticket is validated only when its respective validation indicia is read. In various embodiments, an interleaved 2-of-5 barcode can be employed for validation purposes, including a validation number positioned with or without a scannable barcode, for example. The validation code and/or number can be printed underneath latex or other scratch-off material and can be printed on the front or back of the ticket, in various embodiments. In embodiments, the validation code is printed in uncovered form on the back of the ticket and the validation number is printed on the front of the ticket, under a scratch-off coating, and both the validation code and number are used to validate the ticket. In other embodiments, a PDF417 type barcode can be employed for validation purposes and can be printed on the front or back of the ticket, and this code may be printed with or without a scratch-off coating atop the code, for example. In various embodiments, a PDF417 code can include a three or four-digit identification number used to validate the ticket. Other types of readable codes can be employed as well.

Ticket set 30 further shows an activation code 48 and a perforated seam 50 extending length-wise along the ticket. The seam 50 is formed along the left edges of tickets 35 and 36 and along the right edges of tickets 32, 33 and 34. Further, the activation code 48 extends across at least a portion of all of the tickets 32-36. As shown in FIG. 2, the activation code 48 also extends across the perforation seam 50. In various embodiments, the activation code 48 acts as a global activation indicia which is machine-readable and wherein none of the tickets in the corresponding ticket set are activated for play until the single global activation indicia is read by a suitable code reader. Suitable code readers can be provided in the form of barcode readers operable by retail sales clerks, or provided in connection with self-serve ticket kiosks. Thus, when a reader in communication with device 14 scans the code 48, the device 14 informs the system 10 by communication over network 11, and activation management component 26 activates each individual ticket 32-36 of the ticket set 30. Thereafter, the tickets 32-36 can be played, and if any of the tickets is a winner, the player can bring the winning ticket to a retailer terminal or self-service terminal 14 to scan the respective validation code 42-46. It will be appreciated that the activation code 48 can be provided externally of the ticket set 30, such as on a box or package containing the ticket set 30, or on a separately identifiable article contained within the box or package containing the ticket set 30 when it is delivered to the retailer for sale, for example.

When a reader scans the validation code of a winning ticket, the device 14 informs the system 10 which communicates with validation management component 28, which can then compare the scanned code with the database 24 of activated winning tickets. Should the validation management component 28 determine that the validation code is valid and/or authentic, the system 10 communicates with the terminal that the code is approved, and the retail clerk and/or self-service terminal can pay any associated winnings to the player.

As shown in the ticket set 53 of FIG. 3, the code 48 extends diagonally across ticket set 53, and across the perforated seam 50. As shown in the ticket set 55 of FIG. 4, the code 58 is a barcode that extends diagonally across ticket set 55, and across the perforated seam 50. As shown in the ticket set 57 of FIG. 5, the code 58 extends across the left edges of three tickets 60, 61 and 62, and across the right edge of ticket 63, while still extending across the perforated seam 50. While code 48 is shown as an alphanumeric code in FIGS. 2 and 3, and code 58 is shown as a barcode in FIGS. 4 and 5, it will be appreciated that various types, formats and arrangements of codes or indicia can be employed in accordance with the present invention. It will further be appreciated that the global activation indicia can be represented as an alphanumeric code, an alphabetical code, a numeric code, a symbol code, a barcode or other code. The global activation indicia (e.g., 48, 58) can be partially printed across a first ticket, partially printed across a second ticket, and partially printed across additional tickets of a given ticket set, such that the global activation indicia is not readable in its entirety solely from the first lottery ticket, solely from the second lottery ticket, or solely from any additional ticket in the set, if present.

It will be appreciated that the entire game card, sheet or ticket set can be printed so as to include a single, global activation indicia, such that when the entire sheet is sold, the entirety of individual game tickets can be activated simultaneously. In various embodiments, the tickets are not activated for play, and cannot be redeemed, until the global activation indicia are read. When the individual game ticket validation codes are read, embodiments of the present invention can operate to individually assess whether the ticket is a winner, as well as whether the ticket has previously been redeemed. In various embodiments, the individual tickets comprising a given ticket set cannot be independently sold, and are only sold as part of the given ticket set, yet the individual tickets can be independently validated as described herein.

As shown in the ticket set 70 of FIG. 6, a first ticket is shown at 71 and has a first edge 80 and a second edge 82. A second ticket 72 includes a primary edge 84, a secondary edge 86 and a tertiary edge 88. The primary edge 84 of the second ticket 72 coincides with (e.g., is connected to) the first edge 80 of the first ticket 71. A third ticket 73 includes an initial ticket edge 90, a supplemental ticket edge 92 and a bottom edge 93. The initial ticket edge 90 of the third ticket 73 coincides with the tertiary edge 88 of the second ticket 72. A fourth ticket 74 includes a top ticket edge 94 that coincides with bottom edge 93 of third ticket 73, and further includes a side edge 95. The second edge 82 of the first ticket 71, secondary edge 86 of the second ticket 72, supplemental ticket edge 92 of the third ticket 73 and side edge 95 of the fourth ticket coincide with a left edge 98 of a fifth ticket 75 and a left edge 99 of a sixth ticket 76. Edges 82, 86, 92, 95, 98 and 99 thus form a seam 100, and this seam 100 can be perforated along its entire length or portions thereof depending upon the desired separation of the individual tickets and the given layout of the ticket set. As further shown in FIG. 6, the fifth ticket 75 includes an underside edge 102 and the sixth ticket 76 includes a top side edge 104 that coincides with underside edge 102. The coinciding edges as described can be scored, perforated or otherwise weakened to facilitate the disconnection of pairs of tickets from one another along their respective coinciding edges.

Alternative embodiments of ticket sets and connecting ticket edges are shown, for example, in the ticket set 110 of FIG. 7, ticket set 112 of FIG. 8, ticket set 114 of FIG. 9, ticket set 116 of FIG. 10, ticket set 118 of FIG. 11, ticket set 120 of FIG. 12, ticket set 122 of FIG. 13, ticket set 124 of FIG. 14, ticket set 126 of FIG. 16, ticket set 128 of FIG. 17, ticket set 130 of FIG. 18, ticket set 132 of FIG. 19, ticket set 134 of FIG. 20 and ticket set 136 of FIG. 21. It will be appreciated that the specific references to a first edge, second edge, third edge, primary edge, secondary edge, tertiary edge, initial edge, supplemental edge, top edge, bottom edge, left edge, right edge, alpha edge, beta edge and any other named edge will not restrict the interpretation of such edges to those described above in FIG. 6 or any other figure. Rather, various names of edges can apply to a variety of ticket arrangements for the various ticket sets shown in FIGS. 2 through 21 and other ticket sets not shown. For example, in FIG. 7, first lottery ticket 140 has a first edge 142 and a second edge 144, a second lottery ticket 146 has a primary ticket edge 148 and a secondary ticket edge 150, wherein the primary ticket edge 148 is connected to the first edge 142 of the first ticket 140. A third lottery ticket 152 is also shown having an initial ticket edge 154 and a supplemental ticket edge 156, wherein the initial ticket edge 154 of the third lottery ticket 152 is connected to the second edge 144 of the first ticket 140 and the secondary edge 150 of the second ticket 146. FIG. 7 also shows a fourth lottery ticket 160 having at least an alpha edge 162 and a beta edge 164, wherein the fourth lottery ticket 160 is connected to the third lottery ticket 152 along one of the edges 162, 164.

In the various embodiments shown in FIGS. 2 through 21, and in other embodiments not shown, a global activation indicia can be partially printed across one or more of the connected lottery tickets in the ticket set, such that the global activation indicia is not readable in its entirety solely from the first, second or third lottery tickets.

In various embodiments of the present invention, methods can be employed for printing ticket sets, including the steps of printing game ticket indicia on a substrate, wherein the game ticket indicia comprises multiple individual game tickets; forming two or more perforation lines on the substrate to permit manual separation of the individual game tickets from the substrate; and printing multiple individual game validation indicia on multiple areas of the substrate or sheet corresponding to multiple individual tickets or games. A ticket set activation process can occur by using a properly equipped reader to read the global game activation indicia, which can be printed on one or more of the tickets, on a package for the tickets or on an article separate and apart from the tickets. An activation management module can be employed to activate the multiple individual game tickets. In various embodiments, the multiple individual game tickets are activated substantially simultaneously. Further, game validation indicia can be provided on each individual ticket, such that each individual ticket includes unique validation indicia, and such that the individual game tickets can be validated at different times.

It will be appreciated that all of the disclosed methods, games, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, games, and procedures.

Unless otherwise stated, devices or components of the present invention that are in communication with each other do not need to be in continuous communication with each other. Further, devices or components in communication with other devices or components can communicate directly or indirectly through one or more intermediate devices, components or other intermediaries. Further, descriptions of embodiments of the present invention herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, a processor (e.g., a microprocessor or controller device) receives instructions from a memory or like storage device that contains and/or stores the instructions, and the processor executes those instructions, thereby performing a process defined by those instructions. Further, programs that implement such methods and algorithms can be stored and transmitted using a variety of known media. At a minimum, the memory includes at least one set of instructions that is either permanently or temporarily stored. The processor executes the instructions that are stored in order to process data. The set of instructions can include various instructions that perform a particular task or tasks. Such a set of instructions for performing a particular task can be characterized as a program, software program, software, engine, module, component, mechanism, or tool. Common forms of computer-readable media that may be used in the performance of the present invention include, but are not limited to, floppy disks, flexible disks, hard disks, magnetic tape, any other magnetic medium, CD-ROMs, DVDs, any other optical medium, punch cards, paper tape, any other physical medium with patterns of holes, RAM, PROM, EPROM, FLASH-EEPROM, any other memory chip or cartridge, or any other medium from which a computer can read. The term “computer-readable medium” when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, optical or magnetic disks and other persistent memory. Volatile media can include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions associated with the present invention to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP), Wi-Fi, Bluetooth, GSM, CDMA, EDGE and EVDO. Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present invention, as will be understood to one of ordinary skill in the art.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A lottery system for game ticket sets, comprising:

a printed ticket set, comprising a first lottery ticket bearing a first ticket validation indicia and comprising at least first and second ticket edges defining a first lottery ticket size, a second lottery ticket bearing a second ticket validation indicia and comprising at least a primary ticket edge and a secondary ticket edge, wherein the primary ticket edge and the secondary ticket edge define a second lottery ticket size, wherein the primary ticket edge is connected to the first edge of the first lottery ticket, and a third lottery ticket bearing a third ticket validation indicia and comprising an initial ticket edge and a supplemental ticket edge, wherein the initial ticket edge and the supplemental ticket edge define a third lottery ticket size, wherein the initial ticket edge of the third lottery ticket is connected to the second edge of the first lottery ticket and the secondary edge of the second lottery ticket, and wherein the third lottery ticket size is different from at least the first lottery ticket size or the second lottery ticket size; and a computer-based lottery system comprising at least one processor executing a plurality of instructions stored in at least one memory device including storing data corresponding to the first, second and third ticket validation indicia, wherein the lottery system receives data corresponding to the reading of at least one of the first, second or third ticket validation indicia, and subsequently validates the first, second or third lottery ticket depending upon whether the received data corresponds to the first, second or third ticket validation indicia.

2. The system of claim 1, wherein the first ticket validation indicia is a machine-readable code and the second ticket validation indicia is a machine-readable code, and further wherein the first ticket is validated only when the first ticket validation indicia is read, and the second ticket is validated only when the second ticket validation indicia is read.

3. The system of claim 1, wherein the connection between the first and second lottery tickets is perforated along a first perforation line that does not extend into the third lottery ticket.

4. The system of claim 1, wherein the system further receives data corresponding to the reading of a single global activation code associated with the printed ticket set in its entirety, wherein the global activation code is partially printed across the first lottery ticket, partially printed across the second lottery ticket and partially printed across the third lottery ticket, such that the global activation code is not readable in its entirety solely from the first, second or third lottery ticket.

5. The system of claim 1, wherein the ticket set has a length and a perforated seam dividing the printed ticket set into a first column and a second column, wherein the first column comprises a first number of lottery tickets including the first lottery ticket and the second lottery ticket, and wherein the second column comprises a second number of lottery tickets including the third lottery ticket, and wherein the first number of lottery tickets is different from the second number of lottery tickets.

6. The system of claim 1, wherein the ticket set has a length and a width, wherein a perforated seam extends along the connection between the initial ticket edge of the third lottery ticket and the second edge of the first lottery ticket, wherein the perforated seam further extends along the connection between the secondary edge of the second lottery ticket and the initial ticket edge of the third lottery ticket, and wherein the connection between the first and second lottery tickets is perforated along a first perforation line that does not extend across the width of the ticket set.

7. The system of claim 1, wherein the first lottery ticket further comprises a first lottery ticket purchase price, the second lottery ticket further comprises a second lottery ticket purchase price and the third lottery ticket further comprises a third lottery ticket purchase price, wherein the third lottery ticket purchase price is different from at least the first or second game ticket purchase price.

8. The system of claim 7, wherein the printed ticket set further comprises a printed ticket set purchase price that is less than a sum of the first, second and third lottery ticket purchase prices.

9. A method, comprising:

printing game ticket indicia on a substrate, wherein the substrate comprises a length and a width, and wherein the game ticket indicia comprises at least three individual game tickets, including first, second and third game tickets, wherein the first game ticket comprises a first ticket edge and a second ticket edge, wherein the second game ticket comprises a primary ticket edge and a secondary ticket edge, and wherein the third game ticket comprises an initial ticket edge and a supplemental ticket edge;

forming two or more perforation lines on the substrate to permit manual separation of the individual game tickets from the substrate, wherein the first perforation line is formed so as to extend the length of the substrate and along the second edge of the first game ticket, the secondary edge of the second game ticket and the initial edge of the third game ticket, and wherein the second perforation line is formed so as to extend less than the width of the substrate between the first edge of the first game ticket and the primary edge of the second game ticket, and wherein the second perforation line does not extend along the supplemental ticket edge of the third game ticket; and printing multiple individual game validation indicia on multiple areas of the substrate corresponding to the individual game tickets.

10. The method of claim 9, wherein the step of printing multiple individual game validation indicia comprises printing a first ticket validation indicia on the first game ticket, printing a second ticket validation indicia on the second game ticket and printing a third ticket validation indicia on the third game ticket.

11. The method of claim 9, including the step of reading a single global activation code associated with the individual game tickets on the substrate, wherein the global activation code is partially printed across the first game ticket, partially printed across the second game ticket and partially printed across the third game ticket, such that the global activation code is not readable in its entirety solely from the first, second or third game tickets.

12. The method of claim 11, including reading the global activation code, activating the multiple individual game tickets simultaneously and reading the game validation indicia to validate individual game tickets at different times.

13. The method of claim 9, wherein the first and second ticket edges of the first game ticket define a first game ticket size, wherein the primary ticket edge and the secondary ticket edge of the second game ticket define a second game ticket size, wherein the initial ticket edge and the supplemental ticket edge of the third game ticket define a third lottery ticket size, and wherein the third game ticket size is different from at least the first game ticket size or the second game ticket size.

14. The method of claim 9, wherein the first perforation line is formed so as to divide the substrate into a first column and a second column, wherein the first column comprises a first number of game tickets including the first game ticket and the second game ticket, and wherein the second column comprises a second number of lottery tickets including the third game ticket, and wherein the first number of game tickets is different from the second number of game tickets.

15. The method of claim 9, wherein the first game ticket further comprises a first game ticket purchase price, the second game ticket further comprises a second game ticket purchase price and the third game ticket further comprises a third game ticket purchase price, wherein the third game ticket purchase price is different from at least the first or second game ticket purchase price.

16. The method of claim 9, wherein the substrate further comprises a substrate purchase price, the at least three individual game tickets have respective individual game ticket prices that when added together total a sum of individual game ticket prices, and wherein the substrate purchase price is less than the sum of individual game ticket prices.

* * * * *